Figure 1:
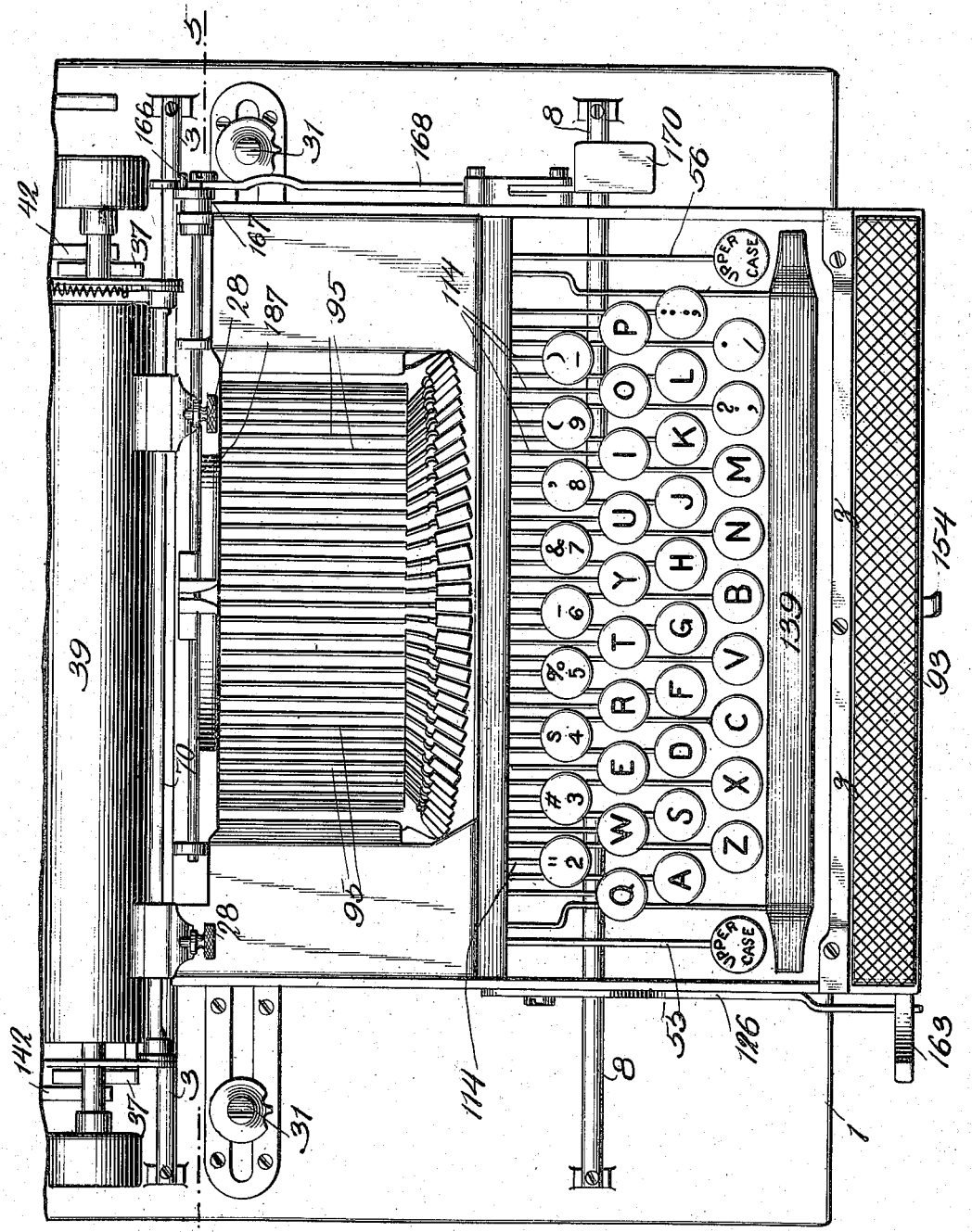

No. 840,554. PATENTED JAN. 8, 1907.
H. A. BRIGGS.
TYPE WRITING MACHINE.
APPLICATION FILED AUG. 22, 1904.

10 SHEETS—SHEET 1.

No. 840,554. PATENTED JAN. 8, 1907.
H. A. BRIGGS.
TYPE WRITING MACHINE.
APPLICATION FILED AUG. 22, 1904.

10 SHEETS—SHEET 4.

WITNESSES:
Harry Gross.
O. H. Hopwood.

INVENTOR
Herbert A Briggs,
BY
J. J. Metcalf
ATTORNEY

No. 840,554. PATENTED JAN. 8, 1907.
H. A. BRIGGS.
TYPE WRITING MACHINE.
APPLICATION FILED AUG. 22, 1904.

10 SHEETS—SHEET 5.

WITNESSES:
INVENTOR
Herbert A. Briggs,
BY
ATTORNEY

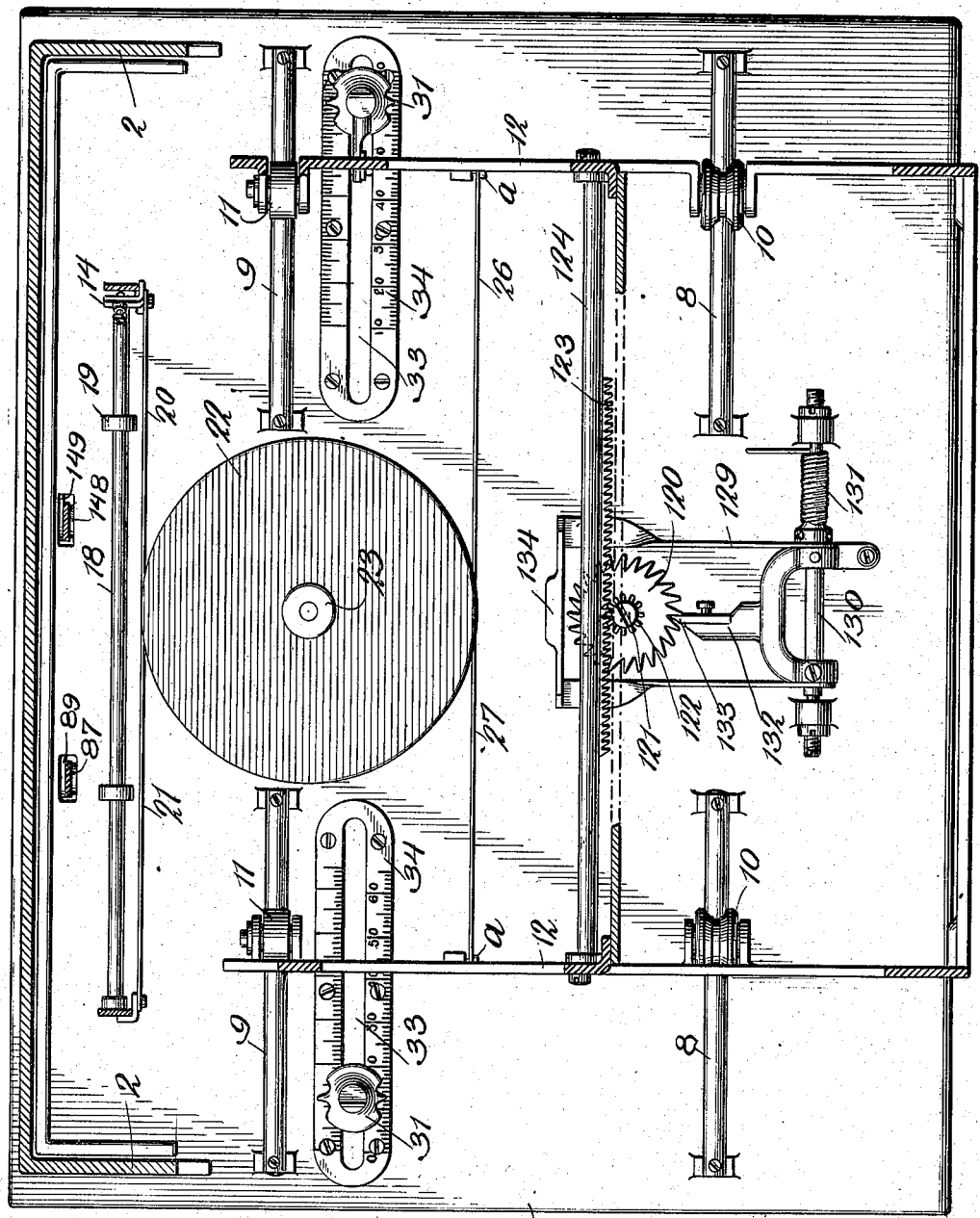

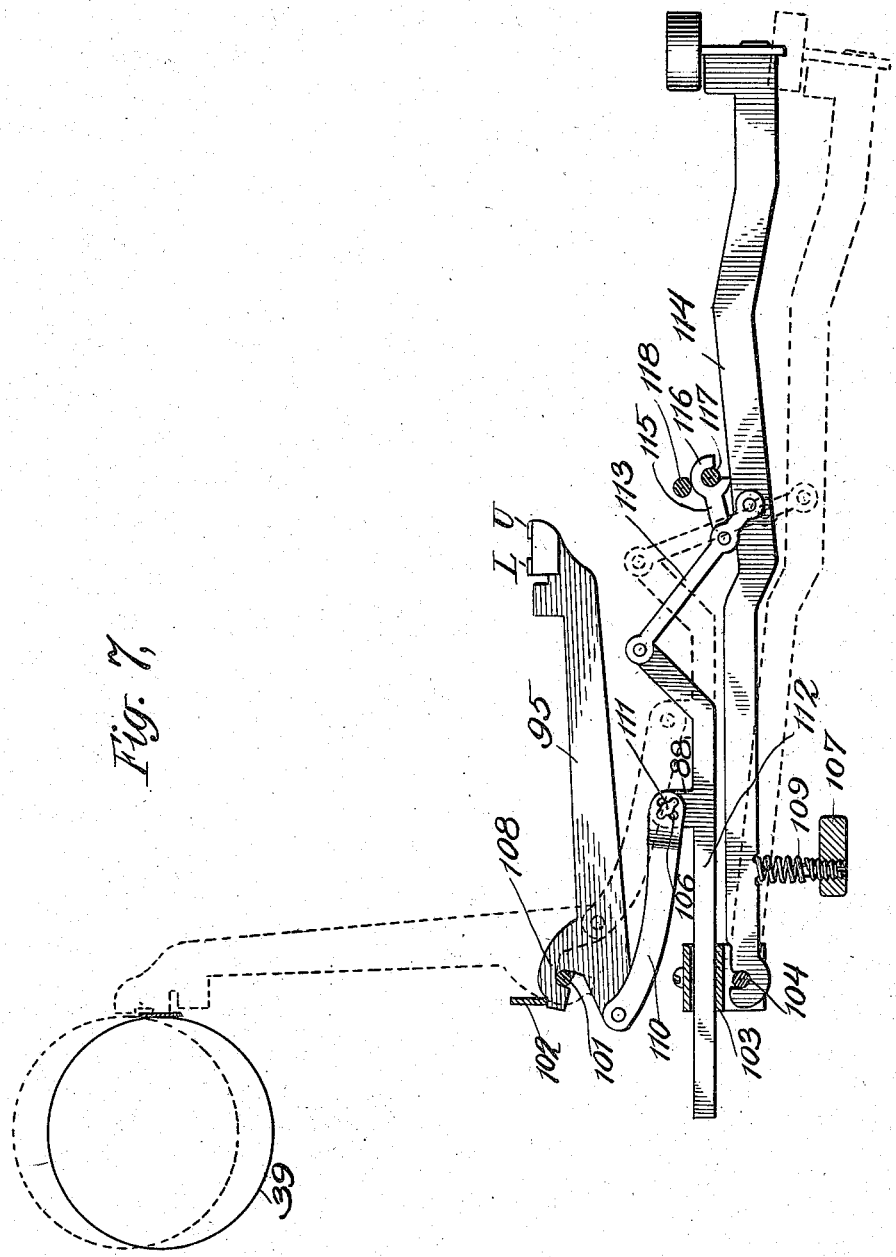

No. 840,554. PATENTED JAN. 8, 1907.
H. A. BRIGGS.
TYPE WRITING MACHINE.
APPLICATION FILED AUG. 22, 1904.
10 SHEETS—SHEET 8.
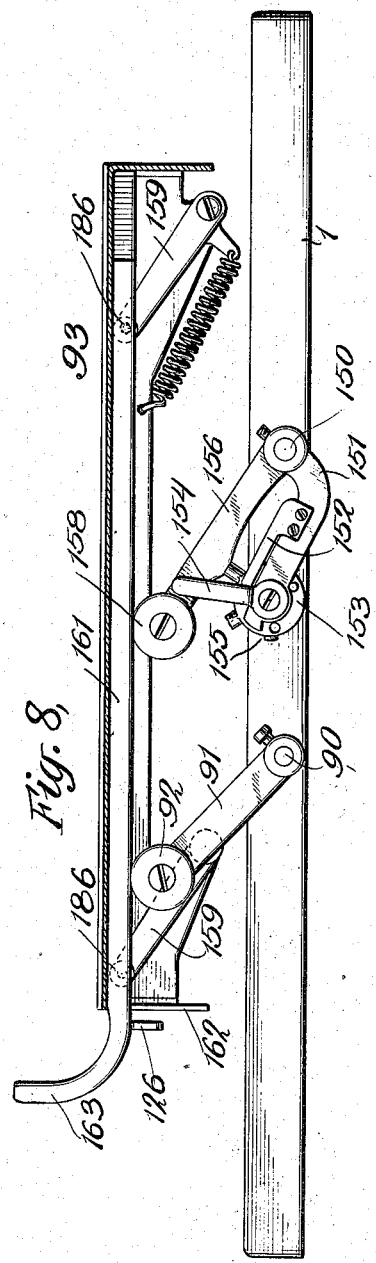
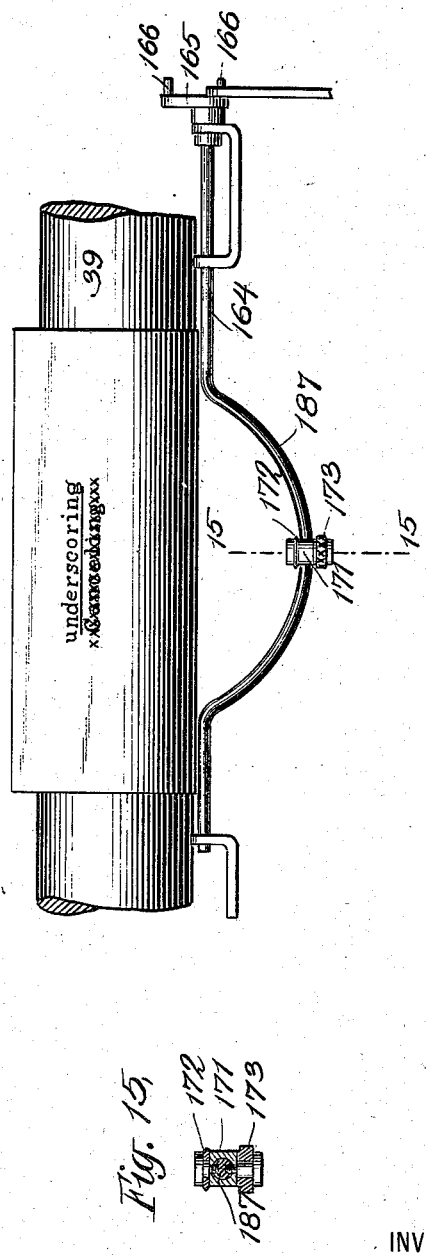
WITNESSES:
INVENTOR
Herbert A Briggs
BY
ATTORNEY No. 840,554. PATENTED JAN. 8, 1907.
H. A. BRIGGS.
TYPE WRITING MACHINE.
APPLICATION FILED AUG. 22, 1904.
10 SHEETS—SHEET 9.
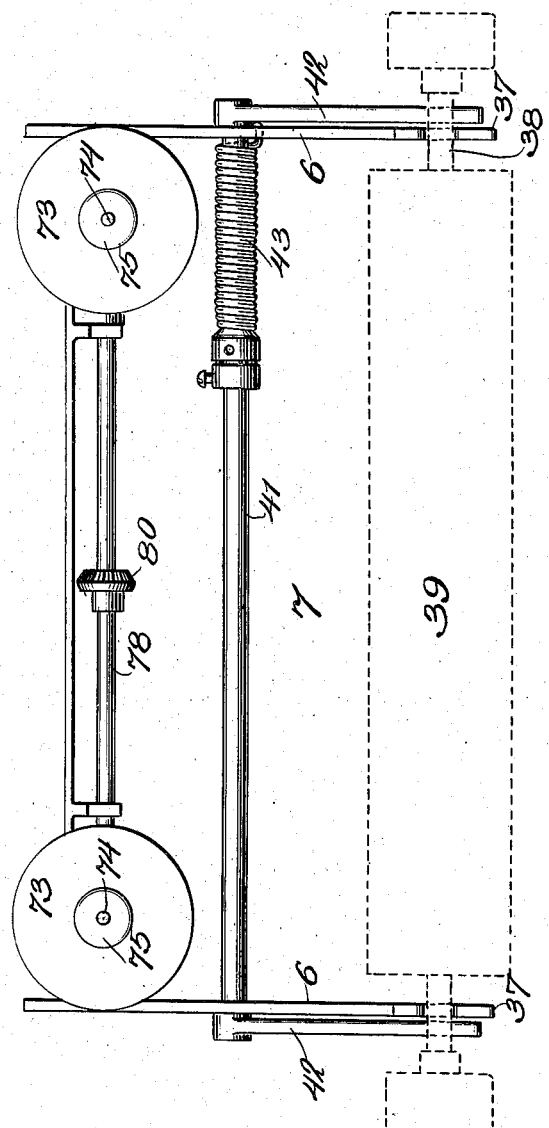
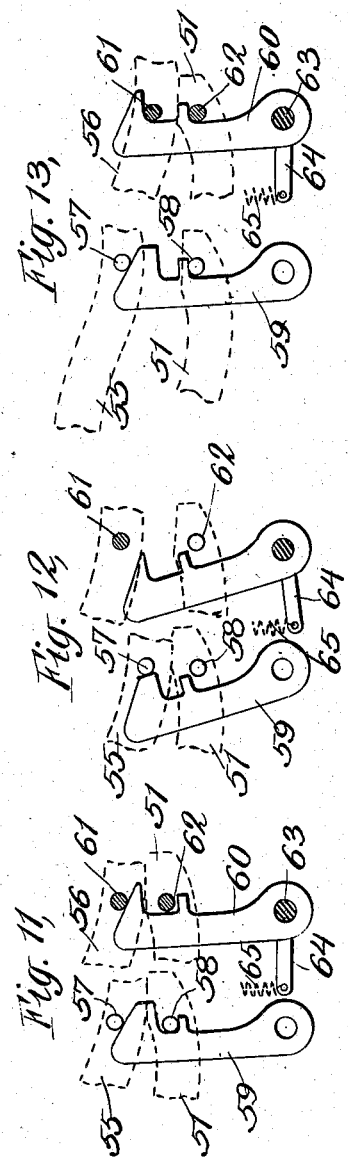
WITNESSES:
Harry Goss
O. H. Hopwood
INVENTOR
Herbert A Briggs
BY
J. G. Metcalf
ATTORNEY

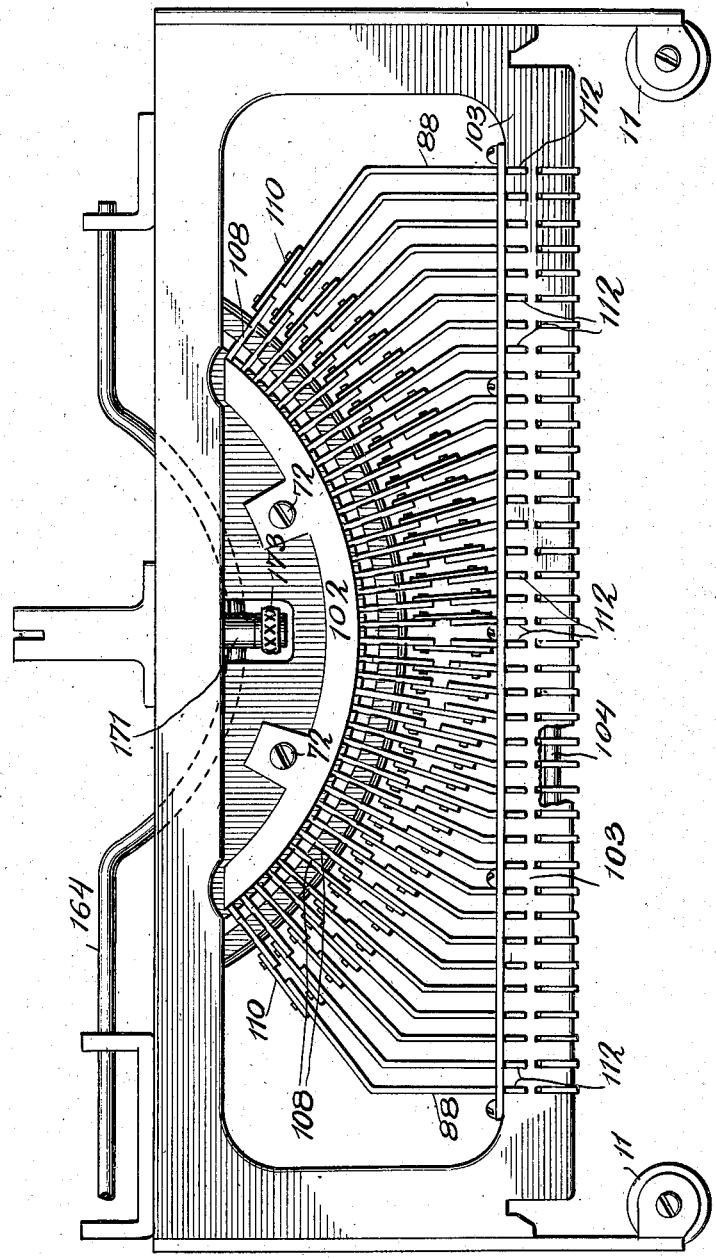

UNITED STATES PATENT OFFICE.

HERBERT A. BRIGGS, OF NEW YORK, N. Y.

TYPE-WRITING MACHINE.

No. 840,554. Specification of Letters Patent. Patented Jan. 8, 1907.

Application filed August 22, 1904. Serial No. 221,756.

*To all whom it may concern:*

Be it known that I, HERBERT A. BRIGGS, a citizen of the United States, and a resident of the borough of Manhattan, city, county, and State of New York, have invented certain new and useful Improvements in Type-Writing Machines, of which the following is a full, clear, and exact description, reference being had to the accompanying drawings, forming part of this specification.

This invention relates to type-writing machines, and has special reference to improvements in machines of this character designed to provide a writing-in-sight machine having special features insuring great speed and ease of manipulation.

To this end the invention contemplates certain practical improvements possessing special utility in connection with a writing-machine of the front-strike type and including in its general organization a traveling type-carriage carrying the printing instrumentalities and a traveling paper-carriage carrying the platen, its auxiliaries, and also carrying the ribbon mechanism. The purpose of the invention in this connection is to provide means for dividing between the two carriages the travel necessary to get from the final letter of one printed line to the initial letter of the next printed line, thus effecting a very great saving in time and space required for this purpose.

The invention also has in view an improved construction of and means for controlling the various mechanisms providing, respectively, for the shift of the platen, for letter-spacing, line-spacing, and the control of the printing mechanism in conjunction with the general manipulation of the machine.

One of the important objects of the invention is to provide a movement-controlling key coöperating with certain mechanism of the machine whereby the operator can, from the keyboard and without removing his hands therefrom, actuate and control the movement of both carriages and also the letter-spacing mechanism, the line-spacing mechanism, and the ribbon mechanism, all of which contribute materially to carrying out the general thought of the invention.

With these and many other objects in view, which will be more readily apparent as the nature of the invention is better understood, the same consists in the novel construction, combination, and arrangements of parts which will be hereinafter more fully described, illustrated, and claimed.

The essential features of the invention involved in carrying out the objects indicated are necessarily susceptible to structural change without departing from the spirit or scope of the invention; but a preferred embodiment thereof is shown in the accompanying drawings, in which—

Figure 2:
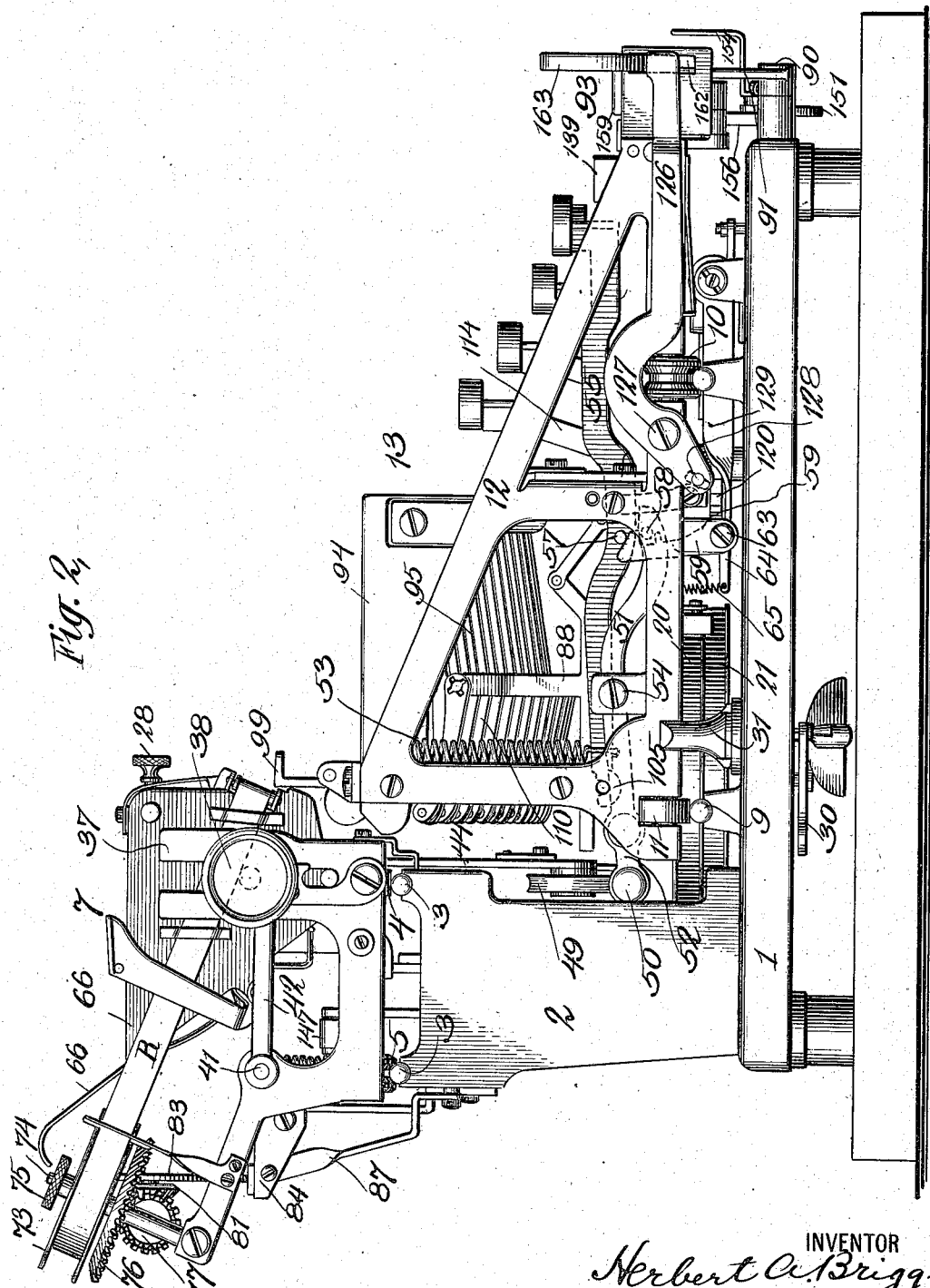
Figure 3:
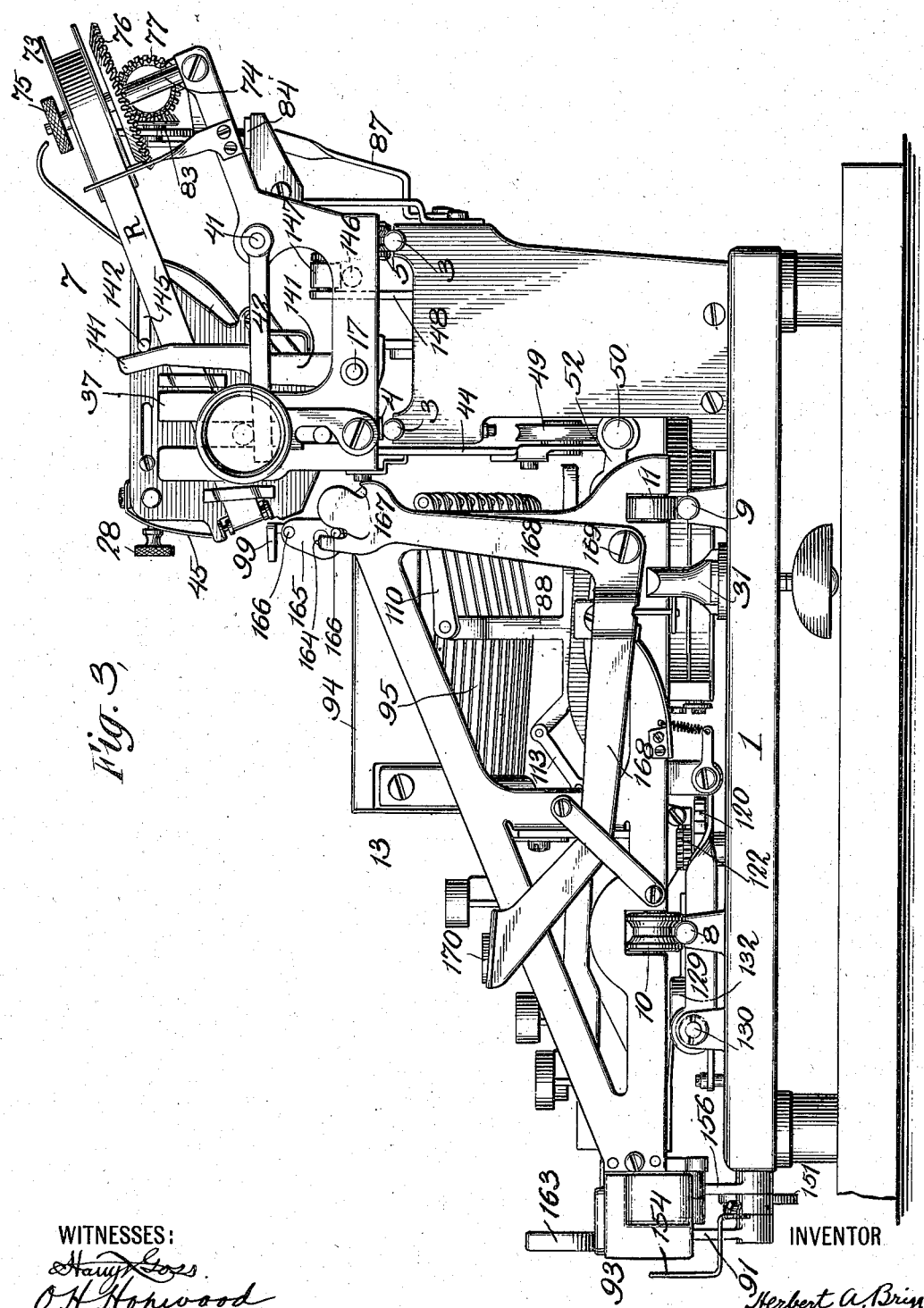
Figure 4:
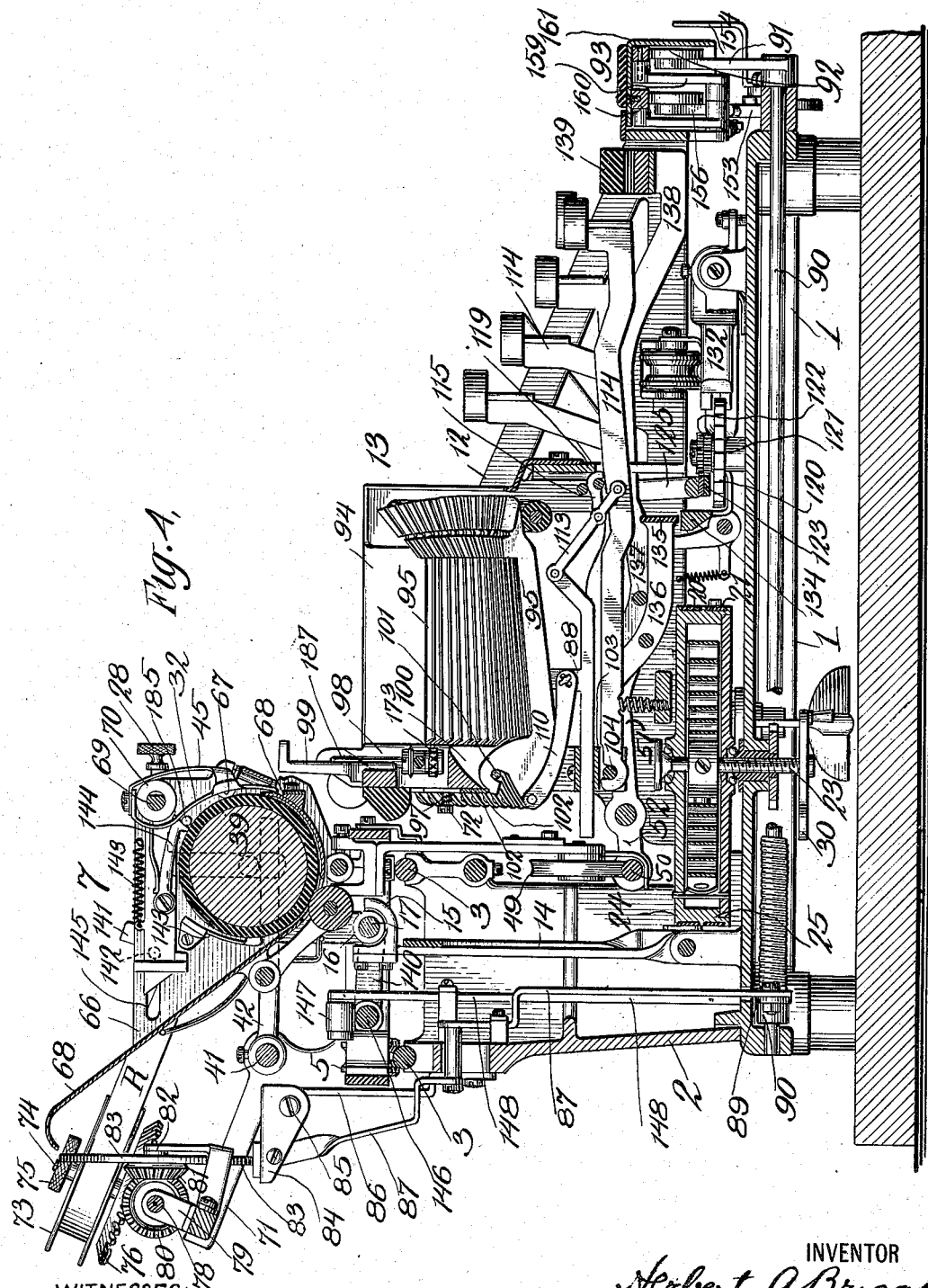
Figure 5:
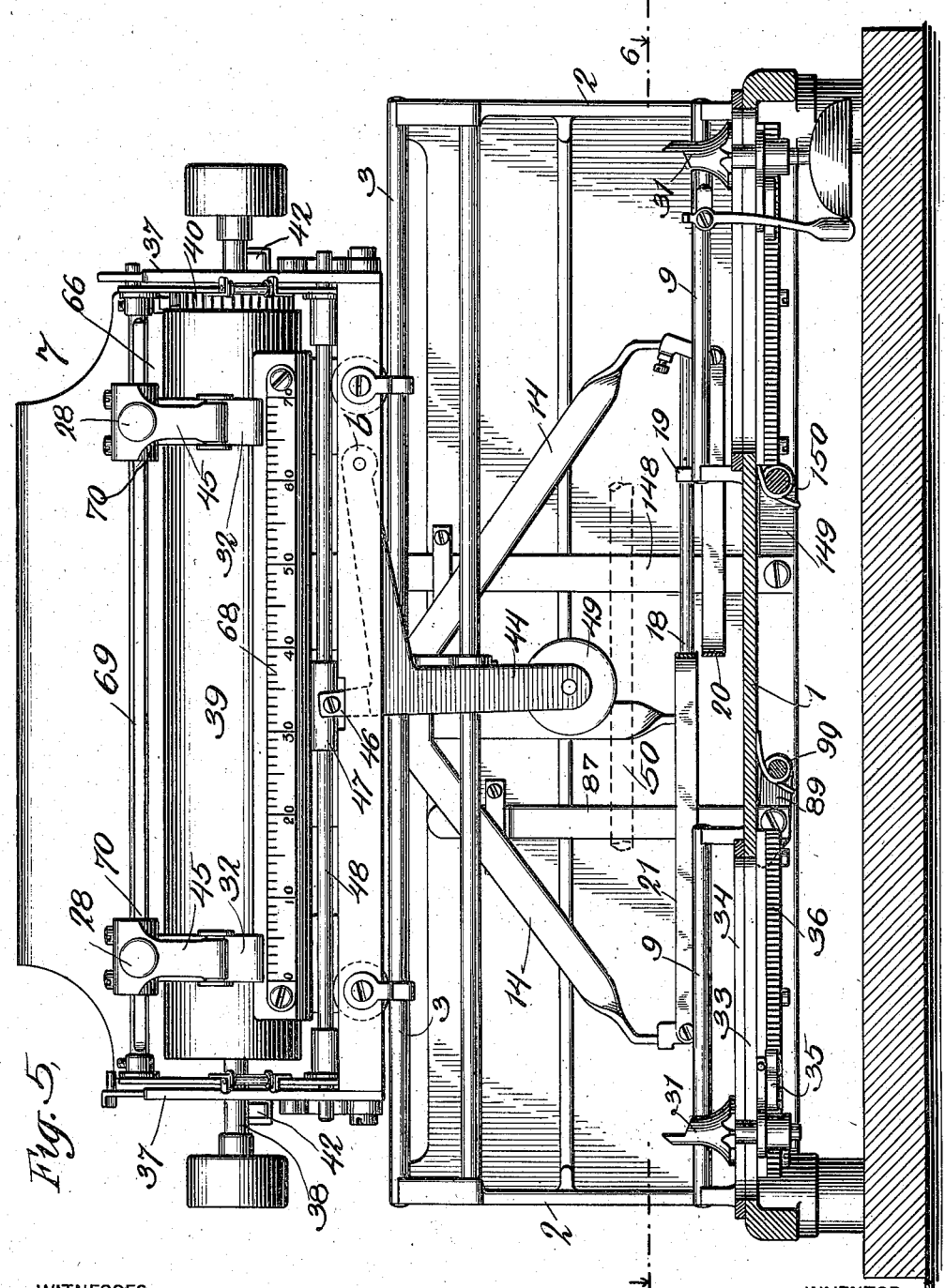

Figure 1 is a top plan view of a type-writing machine embodying the present invention. Fig. 2 is a side elevation of the machine. Fig. 3 is a similar view from the side opposite to that shown in Fig. 2. Fig. 4 is a vertical transverse sectional view of the complete type-writing machine. Fig. 5 is a vertical longitudinal sectional view of the machine in front of the paper-carriage, the line of section being indicated by the section-line 5 5 of Fig. 1. Fig. 6 is a horizontal sectional view immediately above the base of the machine. Fig. 7 is a skeleton view of the type-action. Fig. 8 is a detail sectional view of the controlling-key and the elements directly coöperating therewith. Fig. 9 is a detail view of the canceling and underscoring device. Fig. 10 is a detail view of the paper-carriage, showing the platen in dotted lines. Figs. 11, 12, and 13 are detail views of the locking-latches for the shift-keys. Fig. 14 is a detail view of the rear part of the type-hanger, showing more clearly the pivotal mounting of the type-bars thereon. Fig. 15 is a detail sectional view on the line 15 15 of Fig. 9.

Like reference characters designate corresponding parts in the several figures of the drawings.

The improvements contemplated by the present invention are specially applicable to a type-writing machine wherein the paper-carriage and the type-carriage are connected to move in opposite directions, preferably in unison and in the direction of letter-spacing, whereby a division of the travel may be properly apportioned to each carriage to effect a saving in time and space required to get from the final letter of one printed line to the initial letter of the next printed line. As the improvements center around this combination, reference will first be made to the relative mounting of the paper-carriage and type-carriage. The term "paper-carriage"

as employed herein comprehends the carriage supporting the paper handling and supporting devices, including the platen, while the term "type-carriage" is employed to describe the traveling carriage with the printing instrumentalities supported and carried thereby—i. e., the type - action, which includes the key connection and the auxiliary devices.

As indicated in the drawings, the numeral 1 designates the main horizontal base portion of the machine, provided, preferably at the back thereof, with an upright elevated base-section 2, supporting thereon at the top the opposite parallel elevated track-rails 3, upon which travel the front and rear traveler-rollers 4 and 5, respectively, of the frame 6 of the traveling paper-carriage, (designated in its entirety by the numeral 7.)

The main horizontal base portion 1 of the machine has suitably supported thereon the front and rear rail sections or members 8 and 9, held at a slight elevation above the floor of the base and accommodating for travel thereon the front and rear traveler-rollers 10 and 11, respectively, of the frame 12 of the traveling type or type-action carriage, (designated in its entirety by the reference-number 13.) Thus both of the carriages 7 and 13 have independent traveling supports upon separate parts of the base, and in the preferable construction, as illustrated, the traveling paper-carriage 7 is supported for movement in a higher plane than the type-carriage 13 to insure perfect visibility of writing, as will hereinafter be more fully apparent.

To provide for coupling the two carriages together for movement in unison, and yet in opposite directions, there is associated with the paper-carriage 6 a rigid coupling member 14, which is preferably in the form of a triangular frame centered with reference to the paper-carriage frame and pendent therefrom within the elevated base-section 2, as may be plainly seen in Fig. 5 of the drawings. This rigid pendent triangular coupling-frame 14 carries at its upper end or apex a connecting-yoke 15, coöperating with a grooved collar 16 upon a center rod 17, arranged longitudinally of the paper-carriage frame 6 and forming a part of the frame structure. At the bottom the rigid coupling-frame 14 carries as a base member thereof a bottom slide-rod 18, working in the stationary guides 19, arising from the horizontal portion of the base, and to the opposite extremities of the base part of the coupling-frame 14 are attached the ends of the separate flexible draft-tapes 20 and 21, which have their other terminals respectively attached to diametrically opposite points on a common actuating-drum 22, arranged horizontally over the base and having a vertical pivotal mounting 23 thereon. This common actuating-drum 22 has separate peripheral tape-seats 24 and 25, arranged in different horizontal planes to correspond to the different horizontal planes of the draft-tapes 20 and 21, connected with the pendent coupling-frame 14 of the paper-carriage. Similar to the arrangement and connection of the said draft-tapes 20 and 21 like tapes 26 and 27 are respectively connected to the separate portions of the actuating-drum at diametrically opposite points and to the opposite ends or sides of the type-carriage frame 12, as indicated at a in Fig. 6 of the drawings. This arrangement provides a positive coupling connection between the carriages, whereby the same move simultaneously in opposite directions, and the paper-carriage will in the particular embodiment of the invention illustrated in the drawings necessarily have a travel of only one-half of the extent of the travel of the ordinary paper-carriages.

The actuating-drum 22 constitutes, in effect, a rocker connection between the two carriages, but preferably is of the spring type in order to provide the necessary actuator for letter-escapement purposes. As illustrated in the drawings, the drum carries the usual actuating-spring, and the combined pivot and winding-post 23 therefor has associated with one end thereof a suitable tension-regulating escapement 30, whereby the tension of the spring may be regulated to provide the desired tension for the machine.

The travel of the type-carriage 13 to correspond with the length of the line to be written is controlled through the medium of the oppositely-located marginal stops 31, arranged, respectively, at opposite sides of the transverse center of the base and disposed beyond opposite sides of the type-carriage frame 12. Both of these marginal stops are preferably in the form of upright posts standing above the base and having their stem portions adjustably and slidably mounted in the margin adjustment-slots 33, provided in the base. With each of the slots 33 is associated a scale-plate 34, preferably having graduations upon both sides of the slot, with the lines of the scales alternating, so as to permit a coarser and more legible scale than if a single scale were employed. The stem portion of each marginal stop has associated therewith a suitable ratchet locking device 35, coöperating with a catch-rack 36, fitted on the base beneath each margin slot and providing means, in connection with the device 35, whereby each stop may be locked in any adjusted position, according to the extent of travel to be given the type-carriage.

Referring to the general features of the traveling paper-carriage 7, it will be observed that the carriage-frame 6 is of a general rectangular form and is provided at the opposite ends thereof with the upright vertically-slotted guiding-standards 37, loosely accommodating therein the spindle ends 38 of the roller-platen 39, to which spindle ends are fitted the usual knobs for manipulating the platen in the ordinary way. The roller-platen 39 is provided at one end thereof with a ratchet feed-disk 40, constituting a part of the line-spacing or paper-feed mechanism, to be hereinafter referred to, and by reason of the loose mounting of the spindle extremities in the vertically-slotted guiding-standards 37 the said platen has a vertical shift movement to provide for upper and lower case printing. Inasmuch as shifting means must be associated with the platen to provide for adjusting the position thereof, according to whether upper or lower case characters are being printed, the invention contemplates the employment of a counterbalancing device serving to nearly counterbalance the weight of the platen to ease the lifting action thereof. This counterbalancing device comprises the rock-shaft member 41, arranged longitudinally of the carriage-frame 6 and carrying at opposite ends thereof the rocker counterbalancing-arms 42, extending forwardly from their connection with the shaft 41 and having their extremities disposed beneath the spindles 38 of the platen. A counterbalancing-spring 43 is suitably connected with the rock-shaft member 41 or other convenient part of the counterbalancing device to provide for normally exerting an upward lifting tendency upon the platen for the purpose indicated.

Referring to the means employed for effecting the shift action for the platen, commonly termed the "shift-key action," it will be noted that the lifting connections for the platen comprise a bell-crank adjusting-lever 44, pivoted at one end, as at b, Fig. 5, to the front bar of the paper-carriage frame and having at its angle a yoke 46, coupled on a collar 47, mounted on a frame-rod 48, fitted longitudinally in the paper-carriage frame. At the extremity of its pendent arm the bell-crank lever 44 carries an engaging roller 49, which rides upon a bearing-rail 50, connecting the rear extremities of the side arms 51 of a vertically swinging or oscillating lifting-frame 52, and the bearing-rail part of this lifting-frame is normally held in position for engagement with the engaging roller 49 of the adjusting-lever 44 through the medium of a pressure-spring 53, suitably connected with the frame 52 at one side of its pivot 54 and also with a fixed part of the type-carriage frame 12.

The inner end of each side arm or member 51 of the lifting-frame 52 is disposed directly beneath and engaged by an intermediate portion of a shift-key lever arranged at one side of the keyboard. Hence there are employed two shift-key levers 55 and 56, Fig. 1, arranged, respectively, at opposite sides of the keyboard and carrying the usual operating-keys which constitute a part of the keyboard. For convenience in describing the action of these separate key-levers 55 and 56 the same will be described, respectively, as the left-hand and right-hand shift-key levers.

The left-hand shift-key lever 55 and preferably the left-hand side arm 51 of the lifting-frame 52 are provided with outwardly-projecting catch pins or studs 57 and 58, with which coöperates a recessed hook-shaped latch 59, having a beveled upper end or nose, against which plays the pin 57 on the shift-key lever 55. A somewhat similar latch 60 coöperates with similar catch-pins 61 and 62, projecting from the right-hand shift-key lever 56 and preferably from the right-hand side arm of the lifting-frame 52. The latch 59 is primarily a releasing-latch, and the latch 60 is a locking-latch. Both are rigidly mounted on a pivotally-hung rod 63, which also carries an arm 64, to which is connected one end of a coil-spring 65. The opposite end of the spring 65 is connected with the frame of the type-carriage. The spring 65 thus holds the latches 59 and 60 toward and against the catch-pins on the shift-key levers and lifting-frame.

Referring to Figs. 11–13, the position of the parts above described when the platen is in lower-case position is shown in Fig. 11 with the studs 58 and 62 in the recess of the latches 59 and 60, respectively, whereby the platen is firmly locked in its normal or lower-case position. In order to temporarily lift the platen to upper-case position when it is desired to strike a capital letter, the shift-key on the left-hand shift-key lever 55 is depressed. The lever 55, engaging with the side arm 51 of the lifting-frame 52, will depress the front end of the lifting-frame and elevate the platen to upper-case position. During this downward movement of the lever 55 the stud 57 engages the inclined or camming surface of the latch 59, pressing it back and holding it and the latch 60 out of engagement with the studs 58 and 62, as shown in Fig. 12. Upon releasing the pressure on the shift-key the weight of the platen and its connected parts will cause it to return to lower-case position, and the parts just described will return to their normal position, as shown in Fig. 11. When it is desired to lock the carriage in upper-case position, the shift-key on the right-hand shift-key lever 56 is depressed, and the engagement of the lever 56 with the lifting-frame will carry down the front end of the latter and elevate the platen. During this movement the lever 55 will remain at rest, and the stud 61 on the lever 56 will engage the camming-surface on the latch 60, and both latches will be thereby pushed back, so that when the stud 61 clears the point of the hook on the latch 60 the latches will be thrown forward by the spring 65, carrying the hooks over the studs 58, 61, and 62, as shown in Fig. 13. The platen will thus be held in upper-case position until released by pressure on the shift-key of lever 55, which will cause the stud 57 to throw back both latches, releasing the upper-case engagement and permitting the parts to return to their normal position.

In the preferred construction herein illustrated both of the latches 59 and 60 serve to lock the platen in upper-case position by engaging the studs on the side arms of the lifting-frame; but it is obvious that the latch 60 alone will also serve this purpose by the engagement of the stud 61 on the shift-key lever 56 with the upper hook member of the latch 60.

Reverting to other parts carried by the paper-carriage 7, it will of course be understood that the same is equipped with suitable paper guiding and holding means for guiding the paper toward and about the platen, and, as shown, these auxiliaries may be directly associated with the platen or roller itself, so as to be removable therewith from the main part of the frame 6 without disturbing the position of the latter on its track-rails 3. In this connection the roller-platen 39 is illustrated as being arranged within an open casing 66, having end plates and supporting the paper-guides 68. Also the casing 66 has mounted therein above the plane of the roller a longitudinally-disposed supporting-rod 69, upon which may be adjustably fitted a plurality of paper-clamps.

Each of the paper-clamps comprises a collar 70, slidable upon the rod 69 and held to any adjusted position thereon by the set-screw 28, passing through a threaded opening in the collar and bearing against a flattened side of the rod 69, as plainly shown in Fig. 4 of the drawings; also, a pair of pendent inner and outer spring-arms 32 and 45, respectively, the inner of which is provided with an opening through which is yieldingly pressed the paper-holding roller 67, journaled upon the free end of the outer spring-arm 45. The set-screw 28 is formed with a shoulder bearing against the outer member or arm 45 and serving to set the roller 67 against the platen. Usually the inner and outer arms 32 and 45 are constructed of separate pieces and secured by a common fastening to the collar 70, although it will be observed that this construction can be modified without affecting the adjustment and paper-clamping action of the clamps. In this connection it will also be understood that equivalent devices may be employed for properly guiding and holding the paper in connection with the platen 39, yet the construction shown and described provides a convenient and compact mounting of the roller and its auxiliaries within a common casing which is removable and replaceable as an entirety with reference to the guiding-standards 37 of the paper-carriage frame 6.

The paper-carriage frame 6 has offset from the rear portion thereof a rearwardly-projected oblique bracket extension 71, upon which is supported the ribbon mechanism as an entirety, whereby the entire ribbon-carrying mechanism is carried with the paper-carriage. This ribbon mechanism in its general organization embodies the oppositely-arranged ribbon-spools 73, loose upon the spool-posts 74. These posts have loosely mounted thereon sleeves rigid with crown-gears 76 and carrying binding-nuts 75, which when tightened serve to clamp the spools fast to such crown-gears 76. Each crown-gear 76 meshes with a pinion 77, carried by a motion-transmitting shaft 78, journaled in suitable bearings 79 upon the bracket extension 71 and carrying at an intermediate point a driven beveled pinion 80, meshing with a complemental pinion 81, carried on the stub-shaft 82 of a rolling operating-gear 83, which rides upon the surface of the tripping-gear platform or table 84. This tripping-gear platform or table 84 of the ribbon mechanism is normally held in a horizontal position in contact with the periphery of the gear 83 and is pivotally hung, as at 85, upon a stationary bracket 86, carried at the upper end of the elevated base-section 2. Said pivotal tripping-gear platform 84 has connected thereto the upper end of an adjusting-rod connection 87, the lower end of which is pivoted to a rocker-arm 89, carried at the rear end of an operating rock-shaft 90, journaled in bearings beneath the base 1 of the machine and having attached to the front extremity thereof an operating-arm 91, carrying an engaging roller 92, coöperating with a combination movement-controlling key 93, the action of which will be presently referred to.

The ribbon R winds and unwinds from one spool to the other, according to which is fast or loose with its crown-gear, and is arranged through the medium of suitable guides to pass entirely about the roller-casing 66 and have its operative portion extend longitudinally of the platen in front thereof, as may be plainly seen from the drawings.

The action of the movement-controlling key, in conjunction with the ribbon mechanism just described, bears a coöperative relation to the type-action itself, which will now be taken up.

The type-carriage frame 12 is provided at the top with a horizontal type-basket opening 94, which is open throughout at the front, rear, and top, whereby absolute visibility of writing may be provided for, and hence said type-basket opening 94 provides for the arrangement therein of a horizontal type-basket made up of a semicircular series of type-bars 95, normally lying in substantially horizontal positions and striking against the front side of the platen in the manner that is commonly known in the art as "front-strike writing-in-sight machines." The individual type bars 95 carry a plurality of type-faces U or L, representing the upper and lower case characters, and are associated with a hanger ring or segment 98, mounted in an upright position within the rear of the type-basket opening 94 of the type-carriage frame. The hanger-ring 98 has extended from the top side thereof a bifurcated finder-guide 99, within which each type-bar passes, so that it is brought with accuracy to the common printing-point. To provide for the hanging of the series of type-bars 95, the upright segment hanger-ring 98 is provided in the peripheral edge thereof with a plurality of radial type-bar slots 100 and a pivot wire or rod 101, suitably fitted within the body of the ring and intersecting the several slots 100. At its rear side the hanger ring or segment 98 has yieldingly mounted thereon a retaining-plate 102 of a segmental form, Fig. 14, and preferably supported on stud-screws 72, between the heads of which and plate 102 are interposed the coil-springs 97, which permit the plate to yield outwardly when the type-bars are inserted or removed. The function of this yieldingly-mounted plate 102 is that of a retainer for keeping the type-bars in operative position within the slots 100 upon the pivot wire or rod 101, while when it is desired to remove or to replace any one of the type-bars the plate will yield sufficiently to permit the type-bar to be lifted off or placed in position on the pivot-rod 101.

Below the horizontal plane of the ring 98 is arranged a slotted guide-bar 103, and below the plane of the slots of the latter is arranged a stationary fulcrum-rod 104, the function of which parts will be apparent in connection with the mounting of the type-action parts.
However, at this point it may be noted that the shift-key levers 55 and 56 are provided at their rear ends with the pivot-hooks 105, which are loosely held in engagement with the fulcrum-rod 104 through the medium of adjustable supporting-spring 109, interposed between the said levers and a spring-supporting bar 107, mounted across the type-carriage frame, within the bottom portion thereof.
The type-action *per se* includes a swinging type-bar 95, provided at its heel with an open pivot-hook 108, detachably engaging the pivot-wire 101 of the hanger-ring working in a radial slot 100, Fig. 4. To the heel of the type-bar, behind the pivotal point 101, there is pivoted one end of a forwardly-extending intermediate link 110. The opposite end of this link has a detachable pivotal connection with an arm 88 on a reciprocatory pull-bar 112. This detachable connection may be of any suitable character providing for the ready disconnection of the link 110, while at the same time maintaining the said parts pivotally connected in their normal relation; but a preferred construction is shown in the drawings and consists in providing the arm on the pull-rod 112 with a pivot-key 111, adapted to coöperate with a correspondingly-shaped keyhole-slot 106 in one end of the link 110. In positioning the parts the keyhole-slot 106 in the link 110 is brought into registration with the key 111 and then passed over the key, after which a partial turn of the link 110 causes the keyhole-slot to be thrown out of alinement with the key 111, and hence serves to maintain the parts in interlocked relation, though readily detachable.

The arms 88 are preferably formed with the pull-bars 112 as an integral part thereof. In Fig. 7 is illustrated one of the central type-bars and operating-keys. The pull-bars and key-levers are arranged in horizontal planes, and as the type-bars are segmentally mounted provision must be made for the varying distance between the pull-bars and type-bars. This is accomplished by increasing the length of the arms 88 as their positions approach the sides of the machine, and in order to avoid any torsional pull upon the type-bars each arm is projected vertically until it intersects the plane in which its type-bar swings and is then offset or bent into that plane, so that the pull on each type-bar is even and true. This construction is illustrated most clearly in Fig. 14.

The rear end of the pull-bar 112 loosely works through one of the guide-openings of the slotted guide-bar 103, and the front end of the pull-bar is pivotally connected to one end of a swinging toggle-link 113, whose other end is pivoted to a key-lever 114 intermediate the ends of the latter. Intermediate its ends the said swinging toggle-lever 113 has pivotally connected thereto one end of a short fulcrum-link 115, having an open hook 116 dropped over a stationary pivot-rod 117, extending across the type-carriage frame and held in operative engagement with said rod 117 by the retaining-rod 118. The point of connection between the toggle-links 113 and the fulcrum-links 115 and the length of the fulcrum-links, as will be understood, will vary slightly to compensate for the varying lengths of the key-levers for the different banks of keys, the length of the fulcrum-links being less and their point of connection lower for the longer key-levers.

The rear end of the key-lever is removably hooked under the stationary fulcrum-rod 104, and adjacent to the latter an adjustable tension-spring 109 is placed beneath the key-lever and is supported upon the supporting-bar 107. By reason of this construction a convenient individual tension adjustment is provided for each key-lever in order that the tension of all keys may be made alike throughout the keyboard, and each key-lever of course carries its individual key disposed within the keyboard at the front of the type-carriage. Furthermore, it will be observed that by reason of the construction and mounting of parts as described the individual removal of the entire key or type-bar action is permitted, inasmuch as each type-bar can be readily unhooked from its pivot 101 and likewise each key-lever and each fulcrum-link 115 disengaged from their pivotal points 104 and 117, respectively. Also a type-bar and its link 110 can be removed alone by simply unhooking the type-bar from the pivot 101 and disconnecting the link 110 from the pivot-key 111, which is carried with the pull-rod 112.

In connection with the mounting of the short fulcrum-links 115 of the type-action it is to be observed that the forward ends of these several links are arranged to extend slightly between the teeth of a guiding-comb 119 on the type-carriage and providing means for preventing lateral movement of the said fulcrum-links, while the latter are otherwise properly retained in place through the medium of the pivot-rod 117 and the retaining-rod 118.

Referring particularly to Fig. 7, illustrating the type-action, it will be observed that upon the depression of an individual key-lever the toggle 113-115 is straightened out, thereby providing an easy leverage upon the pull-bar 112, which is drawn straight forward. The forward pull on the bar 112 pulls upon the intermediate link 110, with the consequence of sharply throwing the type-bar upward and rearward against the front of the platen. The arrangement described provides for a direct pull upon each type-bar, and the motion starts with the longest and the easiest leverage upon the heel of the type-bar and a corresponding leverage upon the pull-bar, thus securing the most desirable feature of a type-action—i. e., straight pull upon each type-bar through the medium of an easy and quick acting leverage.

While a detailed description has been given of the type-action to bring out its relation to the other mechanisms, the same is not specifically claimed herein, but forms the subject-matter of a divisional application filed May 6, 1905, Serial No. 259,228.

The letter-spacing mechanism of the machine includes a ratchet escapement-wheel 120, Fig. 6, mounted upon a vertical pivot-post 121, supported on the horizontal portion of the base and carrying a pair of pinions 122, Fig. 4, normally meshing with the double rack-bar 123, which latter is carried upon the longitudinal rod 124 of a spring-pressed rack-frame 125.

By reason of employing a pair of pinions 122 and a pair of racks 123 the same can be made coarser than those usually employed, while at the same time securing a finer and more perfect mechanical mesh between the parts. In using two pinions and two racks the same are so arranged that the teeth of the pinions are in alternate relation, and likewise those of the racks are alternately disposed, with the result of producing a fine mesh between the pinions and the racks through the employment of coarse-toothed surfaces.

The release of the racks 123 from the pinions 122 is accomplished through a release-lever 126, Fig. 2, pivotally mounted, as at 127, upon one side of the type-carriage frame and carrying the cam-pin 128, moving against one end of the rod bearing the racks 123.

The release-action is preferably accomplished in connection with the combination movement-controlling key 93, which is intended to provide not only for the release of the carriages, but also for line-spacing and for the disengagement of the ribbon-mechanism gear, as will be presently explained.

The letter-spacing mechanism also includes a spring-retracted pawl-frame 129, arranged horizontally over the base portion 1 of the machine and mounted at one end upon a horizontal pivot-rod 130, with which is associated a retracting-spring 131. The spring-retracted frame 129 carries therewith an oscillating dog-lever 132, bearing the escapement-dogs 133, and at its swinging end the said frame 129 is provided with a tread portion 134, Figs. 4 and 6, for engagement by a universal bar 135, lying beneath all of the key-levers 114 and carried by a normally spring-elevated pivoted frame 136. This universal-bar-carrying frame 136 lies beneath and is depressed by an actuating-rod 137, carried by a pivotal space-key frame 138. This space-key frame supports at the front thereof the space-key 139, lying within the front portion of the keyboard, and at this point it is to be observed that the side members of both the universal-bar frame and the space-key frame have the same pivotal connection and mounting upon the stationary fulcrum-rod 104 as the individual key-levers 114, although, if desired, this detail could be varied.

The line-spacing mechanism includes a spring-retracted rocking actuating-frame 140, mounted upon the center rod 17 of the paper-carriage frame 6 and having an upstanding lever-arm 141, Fig. 3, operating against a stud 142, projected outwardly from a spring-retracted slide 143, carrying a spring-depressed spacing-pawl 144, normally held just free from engagement with the ratchet feed-disk 40 by the pin 185, Fig. 4. The slide 143 is slidably mounted upon the inner side of one of the end plates of the roller-casing 66, and the stud 142 projects through and works in the slot 145, provided in such end plate. The said rocking actuating-frame 140 carries a vertically-movable bearing-rail 146, over and just free from which is an engaging roller 147, carried at the upper end of a pull-rod 148, having at its lower end a rocker-arm connection 149 with the rear end of the operating rock-shaft 150, mounted beneath the base of the machine and carrying at its front end, which is rigidly secured to the rock-shaft 150, a rocker-arm 151. This rocker-arm supports a spring-catch 152, adapted to engage different portions of an adjustable spacing-stop 153. The stop 153 is in the form of a rotatable disk adjusted to its set position by an adjusting-lever 154, suitably connected therewith and held in either of a plurality of positions by the said spring-catch. Upon its periphery the stop-body is provided with projections 155 of different heights. Against these projections rests a lever 156, loosely pivoted at one end on the rock-shaft 150 and carrying at its opposite end a bearing-roller 158, engaged by the movement-controlling key 93. The construction described provides for variable line-spacing, and upon the depression of the said key 93 the shaft 150 is rocked to provide for actuating the line-spacing mechanism for the roller-platen 39. Referring more particularly to this action, it will be observed that when the said key 93 is depressed pressure is placed upon the roller 158, and the operating-lever 156, bearing upon the stop 153 at the swinging end of the rocker-arm 151, causes such arm to swing through an arc, thereby turning the shaft 150. This movement of the shaft 150 causes the pull-rod 148 to be drawn downward, with the consequence of rocking the frame 140 and causing the lever-arm 141 to draw the plunger 143 backward. This movement of the plunger 143 frees the point of the pawl 144 from the pin 185, whereupon the spring for the pawl presses the same into engagement with the teeth of the ratchet-disk 40. The continued backward movement of the plunger 143 causes the turning of the platen the space desired.

The combination movement-controlling key 93 is in the particular form shown somewhat in the form of the ordinary elongated space-key and is arranged at the keyboard within easy reach and control of the operator. This key is yieldingly elevated through the medium of a plurality of supporting-links 159, pivoted on the front of the type-carriage frame and arranged beneath the crown portion of the said key, as may be plainly seen from Fig. 8 of the drawings. One or more of said supporting-links may have spring connections therewith for yieldingly sustaining the said key.

The movement-controlling key 93 houses the members directly engaging the same and has arranged therein separate bearing-rail members 160 and 161, respectively, arranged in parallel planes. One of these bearing-rail members 160 is fixed to the key-body and bears on the roller 158 of the operating-lever 156 for the line-spacing mechanism, while the other rail member 161 is loose from the body of the key 93 and has a bearing on the roller 92 of the operating-arm 91 for the gear-platform 84 of the ribbon mechanism.

The rail member 160 may be made fast to the crown of the key 93, through the medium of screws or equivalent fastenings, as plainly indicated in Fig. 4 of the drawings, while the other rail member 161 has no direct connection with the body of the key 93, but is preferably pivotally connected, as indicated at 186 in Figs. 4 and 8, with certain of the swinging supports 159. Hence a yielding support is thus provided for the key-body, while at the same time the member 161 is permitted to have an independent movement for carriage-release purposes.

The rail 161 is extended through a slot 162 in the left-hand end of the body of the key 93 and is formed at its outer end into a finger-piece 163, which lies over the end portion of the release-lever 126 for the letter-spacing mechanism. The mounting of the rail member 161 permits the same to have a movement independent of the operating-lever 156 for the line-spacing mechanism, whereby by depressing the finger-piece 163 the type-carriage may be released simultaneously with the throwing of the ribbon mechanism out of gear, while by a depression of the key 93 all three actions are simultaneously accomplished—i. e., the release of the carriages for shifting purposes, the disengagement of the ribbon-mechanism gear, and the line-spacing or feed of the paper. The parts may be thus manipulated without requiring the hands of the operator to leave the keyboard.

Another feature of the invention resides in the employment of a canceling and under-scoring device. This in the form shown consists of a rock-shaft 164, Fig. 3, journaled in suitable bearings at the rear of the type-basket opening 94 and carrying at one end a rocker-arm 165, bearing the eccentrically-disposed pins 166 at different distances from the axis of the shaft and coöperating with the separated gear-notches 167 at the upper end of one arm of the bell-crank operating-lever 168, pivoted at its angle, as at 169, at one side of the type-carriage frame and having a key 170 adjacent to the keyboard. The elements 166 and 167 constitute what may be properly termed a "mutilated" gear, which serves to lengthen the leverage of the arm 165 as the rock-shaft 164 is turned to an operative position. The rock-shaft 164 is provided with an intermediate swinging-yoke member 187, Fig. 9, bearing a head 171, upon which are mounted in spaced relation the underscoring and canceling elements 172 and 173, respectively.

In the lower-case position of the platen when the yoke member or frame 187 is swung up the underscoring element comes into position so that by releasing the carriages and sliding the same manually the underscoring will be accomplished. Canceling will be effected in a similar manner, it being only necessary to shift the platen to its upper-case position.

Referring more particularly to the underscoring and canceling elements 172 and 173, the same preferably consist of revolubly-mounted wheels, Fig. 15, the periphery of the former carrying a single raised line for underscoring purposes, and the periphery of the latter preferably carrying a plurality of canceling characters, such as individual x x marks, separated dashes, or like characters, which would provide for an effective obliteration of the writing without danger of mutilating the paper.

In connection with the operation of the canceling and underscoring device it is to be noted that the operator, with the right hand depressing the key 170 and with the left hand depressing the finger-key 163 for releasing the carriages, simply has to sweep the type-carriage in either direction to provide for running the underscoring-line beneath one or more words or the canceling characters directly across one or more words. By reason of this action, coupled with the fact that the two carriages move together in this operation, the time and effort required to cancel or erase a whole line of matter or any part of a line are reduced to a minimum.

From the foregoing it is thought that the essential features and action of the invention will be readily understood; but it should also be understood that various changes in the form, proportion, and minor details of construction may be resorted to without departing from the scope of the invention or sacrificing any of the advantages thereof.

Having thus described my invention, what I claim as new, and desire to secure by Letters Patent, is—

1. In a type-writing machine, paper and type carriages supported to travel in parallel planes, and a horizontal actuating-drum having separate connections respectively with the two carriages.

2. In a type-writing machine, a traveling paper-carriage and a traveling type-carriage, both having movement in the direction of letter-spacing, and a horizontally-arranged actuating-drum common to both carriages and having operative connection with both.

3. In a type-writing machine, paper and type carriages, supported to travel in parallel planes, the paper-carriage having a pendent rigid coupling-frame, an actuating-drum, flexible draft-tapes connected with said drum and the coupling-frame, and similar tapes connected with the drum and with the frame of the type-carriage.

4. In a type-writing machine, the base having an elevated section, a type-carriage supported to travel on the main portion of the base, a paper-carriage supported to travel on the elevated portion of the base, a pendent coupling-frame having a rigid connection with the paper-carriage and a sliding connection with the base, and an actuating-drum having separate draft connections respectively with said coupling-frame and the frame of the type-carriage.

5. In a type-writing machine, the base having an elevated section, a type-carriage supported to travel upon the base, a paper-carriage supported to travel upon the elevated base-section in a plane parallel to the movement of the type-carriage, a pendent coupling-frame having a rigid connection with the paper-carriage frame, and a guided slide connection with the base, an actuating-drum supported on the base, a pair of reversely-arranged draft-tapes respectively connected to opposite portions of the coupling-frame and to diametrically opposite points on the drum, and a pair of like tapes similarly connected with the drum and also with opposite portions of the type-carriage frame.

6. In a type-writing machine, the base having an elevated section, a type-carriage supported to travel on the base, a paper-carriage supported to travel on the elevated base-section above, and in a plane parallel with the plane of movement of the type-carriage, and means for coupling together and operating the said two carriages, whereby the same are caused to move in opposite directions.

7. In a type-writing machine, the base provided with oppositely-arranged margin-adjusting slots, and catch-racks adjacent to said slots, said base being further provided with graduations at the sides of the slots, a paper-carriage, a traveling type-carriage supported on the base, and marginal stops arranged respectively at opposite sides of the base, and each comprising a post adjustable in one of said slots and carrying a ratchet-locking device coöperating with the catch-rack.

8. In a type-writing machine, the base having an elevated section, a paper-carriage supported to travel on the elevated base-section, a type-carriage supported to travel on the base in a plane parallel to the path of movement of the paper-carriage, said type-carriage carrying the entire type-action, whose type-bars are arranged in the form of an approximately horizontal open type-basket and have a striking movement upwardly and rearwardly, and means for connecting and actuating the carriages whereby the same move oppositely in the direction of the letter-spacing.

9. The combination of the traveling paper-carriage, the traveling type-carriage, a vertically-shiftable platen, mechanism for shifting the platen carried by the paper-carriage, actuating mechanism for the shifting mechanism, and a traveling operating engagement between the actuating and shifting mechanisms.

10. In a type-writing machine, the combination with the traveling printing mechanism and a traveling paper-carriage having a shiftable platen, of key-controlled connections for shifting the platen, separate parts of said connections being respectively carried by the said carriages and maintaining a constant operative relation.

11. In a type-writing machine, a traveling type-action, a traveling paper-carriage having a shiftable platen, a key-controlled lifting member carried by the type-carriage, and an adjusting member carried by the paper-carriage and connected with the platen, said adjusting member maintaining a constant operative relation to the lifting member.

12. In a type-writing machine, a traveling type-action, a traveling paper-carriage having a vertically-shiftable platen, a vertically-movable adjusting member operatively related to the platen and carried by the paper-carriage, and a key-controlled-lifting member carried with the type-action, said two members maintaining a constant operative relation.

13. In a type-writing machine, the combination of a traveling type-carriage, a traveling paper-carriage having a vertically-shiftable platen, an adjusting-lever carried by the paper-carriage and connected with the platen for shifting the same bodily, a suitably-supported swinging lifting-frame having an operative connection with said adjusting-lever, and a shift-key operatively related to said lifting-frame.

14. In a type-writing machine, a traveling type-action, a traveling paper-carriage having a vertically-shiftable platen, an adjusting-lever carried by the paper-carriage and operatively connected with the platen for lifting the same, a vertically-swinging lifting-frame pivotally supported on the type-action frame and operatively connected with said adjusting-lever, and separate shift-key connections with the lifting-frame for controlling the position thereof from either side of the keyboard.

15. In a type-writing machine, the combination with the printing mechanism, comprising a traveling type-carriage, of a paper-carriage having a vertically-shiftable platen, a bell-crank adjusting-lever pivotally hung on the paper-carriage frame and operatively connected with the platen for lifting the same, said lever having a pendent arm carrying an engaging roller, a vertically-swinging lifting-frame carrying a bearing-rail for engagement with said roller of the adjusting-lever, and oppositely-arranged shift-key levers arranged to engage with the lifting-frame for elevating the rail part thereof.

16. In a type-writing machine, the combination with the printing mechanism, comprising a traveling type-carriage, of a paper-carriage frame having upright vertically-slotted guiding-standards, the platen having its spindles movable in the slots of the said standards, an adjusting-lever pivotally mounted on the paper-carriage and operatively connected with the platen, said lever carrying an engaging roller, a vertically-swinging lifting-frame having a pivotal support and carrying a rail for engagement with said roller, the said lifting-frame also having oppositely-arranged side arms, oppositely-arranged shift-key levers, each disposed above and engaging a side arm of the lifting-frame, and a locking device coöperating with the shift-key levers and said lifting-frame.

17. In a type-writing machine the combination with the printing mechanism, comprising a traveling type-carriage, of a paper-carriage frame having upright vertically-slotted guiding-standards, a removable open roller-casing carrying paper guiding and holding means, a platen supported and carried by the said casing and having its spindle extremities in the slotted standards, a spring-actuated counterbalancing device having members operatively related to the platen for counterbalancing the same with its attached parts, and key-controlled lifting connections for the platen with its attached parts.

18. In a type-writing machine, the combination with the printing mechanism, comprising a traveling type-carriage, of a paper-carriage frame, a vertically-shiftable platen movably arranged in the paper-carriage frame, a counterbalancing device comprising a spring-actuated rock-shaft journaled on the paper-carriage frame, and rocker-arms carried by the said shaft and bearing under the spindles of the platen, and key-controlled lifting connections for the platen.

19. In a type-writing machine, the combination with the printing mechanism, comprising a traveling type-carriage, and the vertically-shiftable platen, of lifting connections for the platen including a vertically-swinging lifting-frame having oppositely-disposed side arms, a shift-key lever engaging each side arm of the lifting-frame, and a locking device controlled by the shift-key levers and having elements coöperating with the shift-key levers to lock and release the platen.

20. In a type-writing machine, the combination with the printing mechanism, comprising a traveling type-carriage, and the vertically-shiftable platen, of lifting connections for the platen including a vertically-swinging lifting-frame having oppositely-disposed side arms, a shift-key lever engaging each side arm of the lifting-frame, and a locking device controlled by the shift-key levers and having elements coöperating with each of the said side arms of the lifting-frame.

21. In a type-writing machine, the combination with the printing mechanism, comprising a traveling type-carriage, and a vertically-shiftable platen, of lifting connections for the platen, including a swinging lifting-frame having oppositely-arranged side arms, oppositely-arranged shift-key levers which engage the side arms of the lifting-frame, and a locking device including oppositely-arranged locking-latches one of which has a locking engagement with one of the shift-key levers, and both of which have a camming engagement with said levers.

22. In a type-writing machine, the combination with the printing mechanism, comprising a traveling type-carriage, and a vertically-shiftable platen, of lifting connections for the platen including a swinging lifting-frame having oppositely-arranged side arms, oppositely-arranged shift-key levers, which engage the side arms of the lifting-frame, and a locking device including oppositely-arranged locking-latches each of which has a locking engagement with a side arm of the lifting-frame and a camming engagement with the shift-key levers.

23. In a type-writing machine, the combination with the printing mechanism, comprising a traveling type-carriage, and a vertically-shiftable platen of lifting connections for the platen including a lifting-frame having opposite side arms, opposite shift-key levers each engaging with the lifting-frame, and a locking device including oppositely-arranged latches, one of said latches having a locking engagement with one shift-key lever and the other of said latches having a release engagement with the opposite shift-key lever.

24. In a type-writing machine, the combination with the printing mechanism, comprising a traveling type-carriage, and a vertically-shiftable platen, of lifting connections for the platen including a lifting-frame having opposite side arms, opposite shift-key levers each engaging with a side arm of the lifting-frame, and a locking device including oppositely-arranged latches, each having a locking engagement with a side arm of the lifting-frame, one of said latches also having a locking engagement with one shift-key lever and the other having a release engagement with the opposite shift-key lever.

25. In a type-writing machine, the combination with the printing mechanism, comprising a traveling type-carriage, and a vertically-shiftable platen, of a lifting connection for the platen including a lifting-frame, a spring-pressed locking device including oppositely-arranged locking-latches of hook form, and oppositely-arranged shift-key levers each engaging with a locking-latch, one of said shift-key levers having both a camming and a locking engagement with one of the latches, and the other shift-key lever having only a camming release and idle engagement with the other latch.

26. In a type-writing machine, the combination with the printing mechanism, comprising a traveling type-carriage, and a vertically-shiftable platen, of a lifting connection for the platen including a lifting-frame having side arms each provided with a catch-stud, a spring-pressed locking device including oppositely-arranged locking-latches of hook form and adapted to have a locking engagement with the said catch-studs of the lifting-frame, and oppositely-arranged shift-key levers each bearing a stud engaging with a locking-latch, one of said shift-key levers having both a camming and a locking engagement with one of the latches and the opposite shift-key lever having only a camming release and idle engagement with the other latch.

27. In a type-writing machine, the combination with the printing mechanism, comprising a traveling type-carriage, and a vertically-shiftable platen, of means for locking the platen in lower-case position, shift-keys, and means controlled thereby for releasing said lock, and moving the platen to upper-case position.

28. In a type-writing machine, the combination with the printing mechanism, comprising a traveling type-carriage, and a vertically-shiftable platen, of means for locking the platen in lower-case position, shift-keys, and means controlled thereby for releasing said lock, for moving the platen into upper-case position, for locking it in such position and for releasing such lock.

29. In a type-writing machine, the combination with the printing mechanism, comprising a traveling type-carriage, and vertically-shiftable platen, of a lifting-frame, shift-key levers for actuating the lifting-frame, latches having a locking engagement with said lifting-frame to hold it in lower-case position, means controlled by the shift-key levers for releasing said lock and moving the platen into upper-case position, means controlled by one of said shift-key levers for actuating the latches to lock the lifting-frame in upper-case position and means controlled by the other shift-key lever to release said lock.

30. In a type-writing machine, the combination with a traveling paper-carriage carrying a roller-platen having a ratchet-feed disk, and a traveling type-carriage, of the line-spacing mechanism comprising a line-spacing pawl carried by the platen-support and pawl-actuating devices, and key-controlled connections for operating said actuating devices, separate parts of said connections being respectively carried by the said carriages and maintaining a constant operative relation.

31. In a type-writing machine, the combination with the traveling type-carriage carrying at or near its keyboard a controlling-key, a traveling paper-carriage carrying the platen, a line-spacing pawl carried by the platen-support and operatively related to the latter, a pawl-actuating device carried by the paper-carriage, and operating connections between said actuating device and the controlling-key.

32. In a type-writing machine, the combination of a traveling type-carriage having at or near its keyboard a controlling-key, a traveling paper-carriage supporting the platen, a line-spacing device operatively connected with the platen and carried by the paper-carriage, and an operating connection between said line-spacing device and the controlling-key, said operating connection having a traveling engagement with the controlling-key.

33. In a type-writing machine, the combination with a traveling type-carriage and the paper-carriage carrying a roller-platen having a ratchet-feed disk, of the line-spacing mechanism comprising a spring-retracted plunger mounted on the platen-support and carrying a spring-pressed line-spacing pawl engaging said ratchet-feed disk, a spring-retracted rocking actuating-frame mounted on the paper-carriage and having a lever-arm operatively connected with said plunger, said actuating-frame being also provided with a bearing-rail, and an operating connection including a controlling-key at the keyboard, and an operating rock-shaft having a relatively traveling pull-rod connection with said bearing-rail and a rocker-arm connection with the controlling-key.

34. In a type-writing machine, the combination with the printing mechanism, comprising a traveling type-carriage, of the paper-carriage carrying the platen, line-spacing mechanism for said platen including an operating rock-shaft carrying an operating-lever and a variable space-adjusting device for varying the at-rest angle of said lever, and a controlling-key coöperating with said lever, separate parts of said connections for the line-spacing mechanism being respectively carried by the said carriages and maintaining a constant operative relation.

35. In a type-writing machine, the combination with the printing mechanism, comprising a traveling type-carriage, and a roller-platen, of the paper-carriage carrying a line-spacing mechanism for said platen including an operating rock-shaft bearing a rocker-arm, an operating-lever, carrying a bearing element, and an adjustable spacing-stop having a plurality of rest projections of different heights for engagement with the operating-lever, and a controlling-key bearing on the bearing element of said operating-lever, separate parts of said connections for the line-spacing mechanism being respectively carried by the said carriages and maintaining a constant operative relation.

36. In a type-writing machine, a traveling type-carriage, a traveling paper-carriage carrying the roller-platen, line-spacing mechanism including a rocker-shaft carrying a rocker-arm, carriage-feed mechanism including a release-lever, and a movement-controlling key operatively related to said release-lever and the rocker-arm of the line-spacing mechanism separate parts of said connections for the line-spacing mechanism being respectively carried by the said carriages and maintaining a constant operative relation.

37. In a type-writing machine, a traveling type-carriage, a traveling paper-carriage carrying the platen, line-spacing mechanism for the platen including an operating-shaft carrying a rocker-arm, the carriage-feed mechanism including a release-lever, and a movement-controlling key operatively related to said release-lever and said rocker-arm, the release-lever connection with the controlling-key having a movement independent of the latter and also in unison therewith.

38. In a type-writing machine, a traveling type-carriage, a traveling paper-carriage bearing the platen, ribbon mechanism including a tripping-gear part for throwing the mechanism out of gear, the carriage-feed mechanism including a release element, and a movement-controlling key operatively related to the rocker-arm of the line-spacing mechanism, the tripping part of the ribbon mechanism, and to the release element for the carriage-feed mechanism.

39. In a type-writing machine, the traveling type-carriage, the traveling paper-carriage bearing the platen, line-spacing mechanism for the platen including an operating-shaft bearing a rocker-arm, ribbon mechanism having a tripping part for throwing the mechanism out of gear, and a combination movement-controlling key operatively connected with the rocker-arm of the line-spacing mechanism, the tripping part of the ribbon mechanism and the release element of the carriage-feed mechanism, the connection for the release element of the carriage-feed mechanism having a movement independent of the controlling-key and also in unison therewith.

40. In a type-writing machine, the traveling type-carriage, the traveling paper-carriage bearing the platen, the line-spacing mechanism including an operating-shaft bearing a rocker-arm, the ribbon mechanism including a tripping part and an operating rock-shaft connected with said tripping part and bearing a rocker-arm, the carriage-feed mechanism including a release-lever, and a yieldingly-supported movement-controlling key having separate members respectively engaging with the rocker-arms for the line-spacing and ribbon mechanism, the member which engages with the rocker-arm for the ribbon mechanism being arranged for movement independent of the controlling-key and constantly engaged with the release-lever of the carriage-feed mechanism.

41. In a type-writing machine, the traveling type-carriage, the traveling paper-carriage bearing the platen, line-spacing mechanism for the platen, ribbon mechanism including a tripping part, carriage-feed mechanism having a release element, and a movement-controlling key operatively related, to such line-spacing mechanism, to the release for the carriage-feed mechanism, and to the tripping part of the ribbon mechanism, the connection for the carriage-release element having a movement independent of the key and also in unison therewith.

HERBERT A. BRIGGS.

Witnesses:
O. H. HOPWOOD,
S. G. METCALF.